United States Patent
Scherer et al.

(10) Patent No.: US 8,707,721 B2
(45) Date of Patent: Apr. 29, 2014

(54) RAM AIR BASED COOLING AND VENTILATION SYSTEM FOR AN AIRCRAFT

(75) Inventors: Thomas Scherer, Hamburg (DE); Rudiger Schmidt, Fredenbeck (DE); Alexander Solntsev, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 1128 days.

(21) Appl. No.: 12/520,240

(22) PCT Filed: Dec. 12, 2007

(86) PCT No.: PCT/EP2007/010920
§ 371 (c)(1),
(2), (4) Date: Oct. 21, 2009

(87) PCT Pub. No.: WO2008/074433
PCT Pub. Date: Jun. 26, 2008

(65) Prior Publication Data
US 2010/0096118 A1 Apr. 22, 2010

Related U.S. Application Data

(63) Continuation-in-part of application No. 11/956,763, filed on Dec. 14, 2007, now Pat. No. 7,730,728.

(60) Provisional application No. 60/871,168, filed on Dec. 21, 2006, provisional application No. 60/939,633, filed on May 23, 2007.

(30) Foreign Application Priority Data

Dec. 21, 2006 (DE) .......................... 10 2006 060 765
May 22, 2007 (DE) .......................... 10 2007 023 685

(51) Int. Cl.
*B60H 1/32* (2006.01)

(52) U.S. Cl.
USPC ............... 62/239; 62/244; 62/401; 62/402

(58) Field of Classification Search
USPC ............. 62/239, 244, 401, 402, 61; 165/176, 165/152, 153; 454/71, 76, 141
See application file for complete search history.

(56) References Cited

U.S. PATENT DOCUMENTS 2,704,925 A * 3/1955 Wood .............................. 62/172
2,767,561 A * 10/1956 Seeger ............................ 62/241

(Continued)

FOREIGN PATENT DOCUMENTS

DE 10119433 C1 8/2002
DE 10361657 A1 8/2005

(Continued)

OTHER PUBLICATIONS

International Search Report Forms: PCT/ISA/220, PCT/ISA/210, PCT/ISA/237, mailing date of Mar. 28, 2008.

(Continued)

*Primary Examiner* — Cassey D Bauer
(74) *Attorney, Agent, or Firm* — Wood, Herron & Evans, LLP (57) ABSTRACT

A cooling system for an aircraft includes an air inlet through which air from the environment of the aircraft enters a ram air channel, and an air outlet through which air emerges from the ram air channel. A heat exchanger is arranged in the ram air channel. A ventilation device is in fluid communication with the ram air channel. Also connected to the ram air channel is a distribution line to cool at least one heat-loaded component of the aircraft, in particular a cabin air conditioning system, and/or to ventilate an installation space of the at least one heat-loaded component.

13 Claims, 3 Drawing Sheets

(56) References Cited

U.S. PATENT DOCUMENTS

| | | | | |
|---|---|---|---|---|
| 2,966,308 | A | * | 12/1960 | Jensen .................. 236/82 |
| 3,076,604 | A | * | 2/1963 | Robson .................. 236/10 |
| 4,021,215 | A | * | 5/1977 | Rosenbush et al. ........ 62/402 |
| 4,674,704 | A | * | 6/1987 | Altoz et al. ............ 244/1 R |
| 5,669,813 | A | * | 9/1997 | Jairazbhoy et al. ......... 454/69 |
| 5,887,445 | A | * | 3/1999 | Murry et al. ............ 62/402 |
| 2001/0025506 | A1 | | 10/2001 | Buchholz et al. |
| 2005/0115404 | A1 | | 6/2005 | Leigh et al. |
| 2005/0188716 | A1 | | 9/2005 | Brutscher et al. |
| 2006/0185514 | A1 | | 8/2006 | Schwalm et al. |

FOREIGN PATENT DOCUMENTS

| | | |
|---|---|---|
| DE | 102004039667 A1 | 3/2006 |
| EP | 1695910 A2 | 8/2006 |
| GB | 2166542 A | 5/1986 |
| JP | 2006232269 | 9/2006 |
| JP | 2008509842 | 4/2008 |
| RU | 45711 | 5/2005 |
| WO | 2006018226 | 2/2006 |

OTHER PUBLICATIONS

Decision on Granting a Patent for Invention, Russia Patent Office, (7 pgs.) English Translation of Granting a Patent for Invention (4 pgs.), Oct. 19, 2011.

Japanese Patent Office, English language translation Japanese Office Action (3 pgs.) Jun. 21, 2012.

* cited by examiner

RAM AIR BASED COOLING AND VENTILATION SYSTEM FOR AN AIRCRAFT

This application claims the benefit of International Application No. PCT/EP2007/010920, filed on Dec. 12, 2007, which claims priority to German Application No. DE 102007023685.0, filed on May 22, 2007, and to U.S. Application No. 60/939,633, filed on May 23, 2007; and also the benefit of U.S. application Ser. No. 11/956,763, filed on Dec. 14, 2007, which claims priority to German Application No. DE 10 2006 060765.1, filed on Dec. 21, 2006, and to U.S. Application No. 60/871,168, filed on Dec. 21, 2006.

TECHNICAL FIELD

The invention concerns a ram-air based cooling system for an aircraft with which a heat exchanger of a cabin air conditioning system and at least one further component of the aircraft are supplied with cooling air and/or the installation space of the component can be ventilated. This component can be a component of the cabin air conditioning system.

BACKGROUND

In an aircraft, the cabin air conditioning system serves to supply the cabin and the cockpit with fresh air and recirculated air. In addition, the cabin air conditioning system must ensure that also during flight at high altitude a pressure predominates in the cabin and the cockpit which corresponds substantially to the air pressure on the ground. The cabin air conditioning system uses as an air source bleed air from the engines or from an auxiliary engine (APU: auxiliary power unit) which for example can be arranged at the rear end of an aircraft. The temperature of the bleed air is usually approximately 150 to approximately 200° C. It is cooled in a heat exchanger (the so called main heat exchanger or primary heat exchanger). The heat exchanger is supplied with external air which during flight is available as ram air in a ram air channel. On the ground a fan generates an air flow through the heat exchanger to cool the bleed air.

The ram air channel normally comprises a so called NACA ram air inlet channel (NACA: National Advisory Committee for Aeronautics), a diffuser, optionally a ram air channel plenum and a ram air outlet channel. Between the diffuser and the ram air outlet channel is arranged the heat exchanger of the cabin air conditioning system described initially. Furthermore, in the ram air channel a fan can be arranged which on the ground ensures an air flow through the heat exchanger of the cabin air conditioning system.

During flight external air enters the ram air channel via the ram air inlet channel. The dynamic part of the pressure in the diffuser is partly converted into a static pressure which slows down the flow. Consequently, in relation to ambient pressure, a static positive pressure is produced called the ram pressure. The ram pressure causes a flow of external air through the heat exchanger of the cabin air conditioning system. The flow of external air through the ram air channel is controlled by a ram air inlet channel flap. The ram air outlet channel is also usually fitted with a flap. The relatively widely opened flap of the ram air outlet channel generates a reduced pressure in relation to ambient pressure as external air flows around it. Thus, the positive pressure present on the inlet side at the heat exchanger and the reduced pressure present on the outlet side lead to a differential pressure which determines an air mass flow through the heat exchanger. The flaps on the ram air inlet channel and the ram air outlet channel are controlled by actuators.

When the aircraft is on the ground, there is no flow of external air. A fan, for example the fan of the ACM (air cycle machine), causes a flow in the ram air channel so that external air is made available to the heat exchanger of the cabin air conditioning system to cool the hot bleed air.

An aircraft can comprise at least one further ram air channel with which at least one further heat-loaded component of the cabin air conditioning system can be cooled and/or the installation space of the heat-loaded component can be ventilated. The function of this ram air channel substantially corresponds to that of the ram air channel previously described, with the exception that there is no heat exchanger and no ram air outlet channel provided in the ram air channel, but the ram air channel opens into a distribution line which supplies cooling air to a heat-loaded component of the cabin air conditioning system and/or passes air into an installation space in which the heat-loaded component of the cabin air conditioning system is arranged.

Because of leakages, fuel and/or fuel vapours can collect or form in the installation space. The fuel and/or fuel vapour can enter the installation space from the tank. Therefore the installation space of the heat-loaded component must be ventilated, i.e. vented. The ventilation of the installation space should prevent that a combustible mixture can form in the installation space. If the cabin air conditioning system with the heat-loaded component is to be switched on, first the installation space of the heat-loaded component must be ventilated since, also with the air conditioning system switched off, fuel and/or fuel vapour can collect in the installation space. Cooling of the heat-loaded component can also protect the structure against over-heating.

The air flow generated by a fan in the ram air channel must be monitored. If the fan fails, the cabin air conditioning system must be switched off, since a combustible mixture can form in the installation space of the heat-loaded component. This monitoring can be carried out by an air conditioning system switch-off device on which a software is running. The air conditioning switch-off device for example analyses, whether the fan speed lies within a desired range. This air conditioning system switch-off device is an additional device constituting an additional fault source which should be avoided.

This system for ventilating the installation space of the heat-loaded component and for cooling the heat-loaded component is also called UBV (unpressurised bay ventilation). The aim is to guarantee that despite the potential presence of fuel vapours, for example from leakages, no combustible mixture is formed in the installation space of the cabin air conditioning system. The surfaces of some devices of the cabin air conditioning system have hot surfaces, whereby combustion could be provoked. Furthermore, the ventilation system serves to cool the air in the installation space of the cabin air conditioning system.

In an aircraft important devices are always designed redundant. Thus, in an aircraft there are provided two ram air channels to cool the heat exchanger of the cabin air conditioning system and two ram air channels with a distribution line to cool at least one heat-loaded component and to ventilate the installation space of the heat-loaded component. Furthermore, four fans are present to generate an air flow on the ground. The channels and the fans require space, must be maintained and increase the mass of the aircraft.

The object of the invention is to reduce the space requirement of a cooling system.

SUMMARY OF THE INVENTION

To achieve this object, an aircraft comprises a cooling system with a ram air channel, a heat exchanger arranged in the ram air channel and a ventilation device arranged in fluid communication with the ram air channel, wherein furthermore a distribution line for cooling at least one heat-loaded component of the aircraft and/or for ventilating an installation space of the heat-loaded component of the aircraft is connected to the ram air channel. Air from the environment of the aircraft enters the ram air channel through an air inlet. The air exits the ram air channel through an air outlet. The heat exchanger can be a heat exchanger, for example the main heat exchanger and/or the primary heat exchanger, of the cabin air conditioning system described initially. The heat exchanger for example cools hot bleed air. The heat-loaded component is any component of the aircraft which can heat up in operation. The heat-loaded component can be a component of the cabin air conditioning system. It is an advantage of the invention that the weight of the aircraft is reduced and its efficiency increased.

As the distribution line is connected to the ram air channel in which the heat exchanger of the cabin air conditioning system is arranged, even with redundant design of the cooling system only two ram air channels and two ventilation devices are required for the entire aircraft.

The air inlet can have NACA form. The dynamic part of the air flowing into the air inlet from the environment is converted in a diffuser into a static positive pressure. This positive pressure is available at the inlet of the heat exchanger and at the inlet of the distribution line, so that the heat exchanger and the at least one heat-loaded component of an aircraft can be supplied with cooling air.

The ventilation device can be a blower. The blower may be driven electrically or by compressed air, for example engine bleed air. The ventilation device can also be an air injection device which injects air into the ram air channel. The air injected into the ram air channel can have a higher pressure than the air in the ram air channel. The air injected into the ram air channel can be bleed air which has previously been cooled, if required. The ventilation device is used to ensure an air flow through the ram air channel on the ground and/or at low aircraft speed, so that the heat exchanger and the at least one heat-loaded component are supplied with cooling air and/or the installation space of the heat-loaded component is ventilated. Furthermore the ventilation device ensures that the installation space of the heat-loaded component is ventilated so that no combustible fuel vapours can form. The ventilation device can also be activated during flight.

In the ram air channel can be arranged a one-way valve which ensures that the air in the ram air channel can flow only from the air inlet to the air outlet. In particular when the ventilation device is switched on, there is a risk that the air flow generated by the ventilation device is deflected in the direction of the air inlet so that a fluidic short circuit occurs. The one-way valve prevents air being able to flow in the direction of the air inlet.

The ram air channel can be divided into two parallel flow branches, the one-way valve being arranged in the first branch and the ventilation device being arranged in the second branch. As previously stated, the ventilation device ensures that the distribution line for cooling at least one component of the aircraft and/or for ventilating its installation space, and the heat exchanger of the cabin air conditioning system, are supplied with an air flow, if the aircraft is on the ground and/or flying at low speed. The one-way valve prevents a flow in the direction of the air inlet.

The cooling system can be formed such that the distribution line is arranged upstream of the heat exchanger. The terms "upstream" and "downstream" relate to a flow from the air inlet to the air outlet. The ventilation device and the one-way valve are arranged upstream of the distribution device. In this embodiment of the invention, the ventilation device generates a positive pressure which induces a flow in the distribution line and in the heat exchanger.

The ventilation device can be arranged downstream of the distribution line. In this embodiment, the ventilation device generates a reduced pressure which draws air out of the air inlet and the distribution line. The heat exchanger is arranged downstream of the ventilation device. The air emerging from the distribution line has been heated on cooling the at least one component of the aircraft. To ensure that the temperature of air entering the heat exchanger is not too high, a larger part of air should be drawn in from the air inlet and a smaller part of air should be drawn in from the distribution line.

The ventilation device can be arranged downstream of the heat exchanger. In this case the ventilation device generates a reduced pressure which causes an air flow through the heat exchanger. If the distribution line is arranged upstream of the heat exchanger, as stated above, a larger part of air should be drawn in through the air inlet and a smaller part of air should be drawn in through the distribution line so that the air entering the heat exchanger has as low a temperature as possible.

The one-way valve can be arranged upstream of the distribution line. This prevents that an air flow emerges from the distribution line and flows in the direction of the air inlet of the ram air channel.

The blower can be arranged in the ram air channel so that air can flow around it. The blower can be arranged in a blower channel which has a smaller cross-section than the ram air channel. In this embodiment, no one-way valve is required. The blower can generate a flow through the ram air channel on the ground and/or at low flying speed. In flight the air entering through the air inlet can flow past the blower or the blower channel through the ram air channel.

An outlet of the blower or the blower channel can have an outlet area which, in relation to the remaining area of the ram air channel at the outlet of the blower or the blower channel, is dimensioned such that when the blower is transporting air, the static pressure at the outlet area is less than or equal to the static pressure at the remaining area of the ram air channel. This prevents the flow generated by the blower from flowing in the direction of the air inlet. During flight, the air entering through the air inlet flows through the remaining area of the ram air channel past the blower or the blower channel.

The air inlet of the ram air channel and/or the air outlet of the ram air channel can each comprise an actuatable flap. By means of the flap at the air inlet the positive pressure predominating on the inlet side in the ram air channel can be set. By means of the flap arranged at the air outlet of the ram air channel the reduced pressure on the outlet side of the ram air channel can be set. Clearly the air inlet flap and the air outlet flap can be replaced by any device which can vary the flow through the air inlet and the air outlet, respectively.

The invention also concerns a cabin air conditioning system with the cooling system described above, a temperature detection device which detects the temperature of the air that flows from the heat exchanger and is passed into the cabin and is to be cooled by the ram air, and a control device which controls the function of the cabin air conditioning system. The control device is formed such that the cabin air conditioning system is switched off, if the air emerging from the heat exchanger, which is passed into the cabin and is to be cooled by the ram air, exceeds a threshold value. This cabin air conditioning system has the advantage that, by detecting the temperature of the air emerging from the heat exchanger which is passed into the cabin and is to be cooled by the ram air, the function of the ventilation device can be monitored without the need for a separate air conditioning system switch-off device to monitor the function of the ventilation device. The air to be cooled by the ram air in the heat exchanger can be engine bleed air. The cooled air emerging from the heat exchanger can be further treated before it is passed into the cabin.

The temperature of the air emerging from the heat exchanger which is passed into the cabin and is to be cooled by the ram air can be detected by the temperature detection device at the outlet of the heat exchanger and/or at any arbitrary point in the air conditioning system. The air emerging from the heat exchanger which is passed into the cabin and is to be cooled by the ram air can be mixed with another air flow and/or further treated before its temperature is detected. For example, the temperature of the air can be detected at the mixer and/or at the inlet to the cabin.

The air conditioning system is switched off, if the temperature of the air emerging from the heat exchanger which is passed into the cabin and is to be cooled by the ram air exceeds a threshold value. If the ventilation device on the ground supplies no air flow or too small an air flow to adequately ventilate the installation space, the ventilation device consequently supplies too little air to cool the bleed air in the heat exchanger of the air conditioning system. This leads to the air emerging from the heat exchanger or the air conditioning system exceeding the threshold value, which consequently leads to the air conditioning system being switched off. For this reason the separate switch-off device of the air conditioning system in the prior art, for switching off the air conditioning system in the case of a failed ventilation device, can be omitted.

BRIEF DESCRIPTION OF THE DRAWINGS

The invention is now described in more detail with reference to the enclosed figures.

These show.

DETAILED DESCRIPTION

Figure 1:
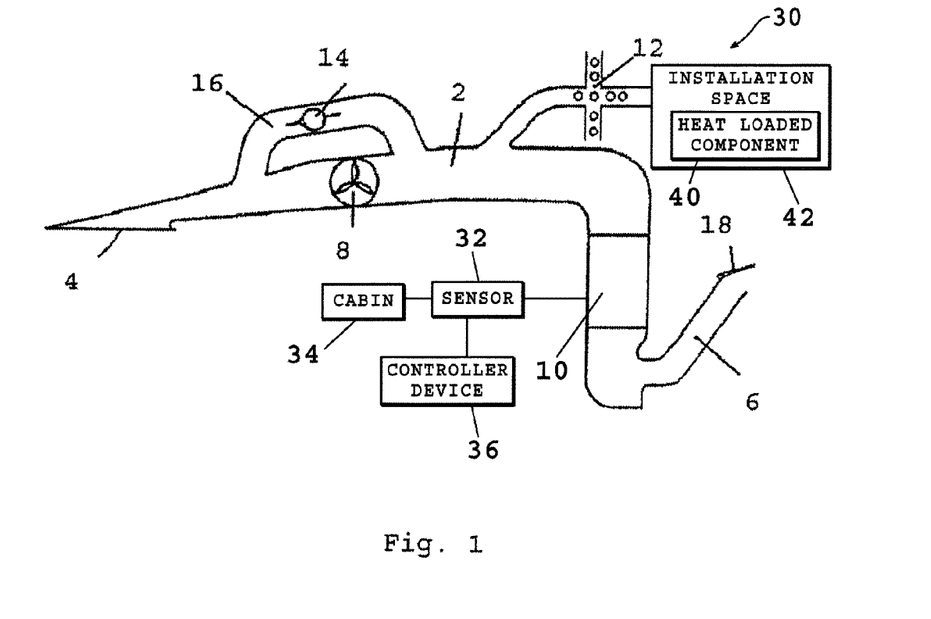
FIG. 1 a ram air channel in which a ventilation device is arranged, wherein the ventilation device is bridged by a bypass with a one-way valve.

FIG. 1 shows a ram air channel 2 with an air inlet 4 and an air outlet 6. The air inlet 4 comprises an air inlet flap (not shown) with which the quantity of air entering the air inlet 4 can be controlled. The air inlet 4 preferably has a NACA form. The air outlet 6 comprises an air outlet flap 18. In the ram air channel 2 is arranged a heat exchanger 10 of a cabin air conditioning system. As previously stated, the cabin air conditioning system controls the temperature of the cabin and in the cockpit and in flight sets a pressure in the cockpit and the cabin which substantially corresponds to air pressure on the ground. The heat exchanger 10 can comprise the main heat exchanger and/or the primary heat exchanger of the cabin air conditioning system. The heat exchanger 10 for example cools hot engine bleed air. The air cooled by the heat exchanger can be passed into the cabin after further conditioning.

Connected to the ram air channel 2 is a distribution line 12 for cooling at least one heat-loaded component 40 of the aircraft and/or for ventilating the installation space 42 of the at least one heat-loaded component 40. The distribution line supplies the cooling air from the ram air channel 2 to the installation space 42 of the heat-loaded component 40 to ventilate, i.e. to vent this so that no combustible mixture can form in the installation space 42. It must be avoided that fuel vapours or fuel can ignite on the at least one heat-loaded component 40. The distribution line 12 passes the cooling air from the ram air channel 2 to components of the cabin air conditioning system (the so called packs), in order for example to avoid structure heating. The distribution line 12 can branch into a plurality of distribution lines. The distribution line 12 comprises a plurality of openings to distribute the cooling air from the ram air channel 2 into an installation space of the air conditioning system components. This installation space furthermore in the fuselage area has openings towards the exterior so that the air can flow out of the installation space again.

The ram air channel branches into a main branch in which is arranged the ventilation device 8, and a bypass branch 16 in which is arranged a one-way valve 14. The ventilation device 8 is preferably a blower. Preferably a diffuser is arranged upstream of the bypass.

In flight, the flow of external air enters the ram air channel 2 via the air inlet 4 which normally has a NACA form. The dynamic part of the air flowing into the air inlet in the diffuser is partly converted into a static pressure. Consequently, a static positive pressure is produced at the inlet of the heat exchanger 10 and at the connection of the distribution line 12. The air inlet flap (not shown) controls the flow of air into the ram air channel 2 and hence the positive pressure in the ram air channel 2.

Usually the air outlet 6 comprises an air outlet flap 18. External air flows around the relatively widely opened air outlet flap 18 and thus generates a reduced pressure in relation to the ambient pressure in the air outlet 6. The reduced pressure can be set by means of the air outlet flap 18. This reduced pressure supports the flow through the heat exchanger 10.

The air inlet flap (not shown) of the air inlet 4 can be opened so that the positive pressure in the ram air channel 2 ensures a volume flow in the distribution line 12 which is sufficient to cool the at least one component of the aircraft and/or to ventilate its installation space. The air outlet flap 18 at the air outlet 6 can control the air quantity flowing through the heat exchanger 10. The air quantity flowing through the heat exchanger 10 can for example be reduced, if the cabin is to be heated.

The air inlet flap (not shown) and the air outlet flap 18 can be adjusted by means of actuators. The actuator can for example be a rotation motor with a worm which converts a rotary motion into a linear motion. Clearly the air inlet flap and the air outlet flap 18 can be replaced by any device which can vary the flow through the air inlet and the air outlet, respectively.

When the aircraft is on the ground, the ventilation device 8 draws in air through the air inlet 4. The one-way valve 14 in the bypass prevents the air transported by the ventilation device 8 from flowing back in the direction of the intake side of the ventilation device 8. The air transported by the ventilation device 8 enters the distribution line 12, where components of the aircraft, in particular components of the air conditioning system, are cooled and/or their installation space is ventilated. Furthermore, the air enters the heat exchanger 10 of the cabin air conditioning system and leaves the ram air channel 2 via the air outlet 6.

The ventilation device 8 can be independent of the ACM so that the energy used to drive the ACM fan can be used to increase the performance of the cabin air conditioning system, or the cabin air conditioning system can be operated with bleed air at a lower intake pressure while retaining a constant cooling performance. The ventilation device is usually operated only, if the aircraft is on the ground. It can, however, if required, also be switched on in flight. The ventilation device 8 must be designed so that it can also be operated during the entire flight. The ventilation device can be a blower which is operated electrically or by compressed air, for example bleed air. In flight the air flows from the air inlet 4 through the one-way valve 14 in the direction of the distribution line 12 and the heat exchanger 10. The air can, however, also flow from the air inlet 4 through the ventilation device 8.

As previously stated, because of leakages fuel and/or fuel vapours can collect or form in the installation space of the at least one heat-loaded component. The fuel and/or fuel vapour can enter the installation space from the tank. Therefore the installation space of the heat-loaded component must be ventilated, i.e. vented before the system with the heat-loaded component is switched on. The ventilation of the installation space should prevent that a combustible mixture can form in the installation space. The operation of the cabin air conditioning system can furthermore only be continued if it is guaranteed that no combustible mixture can form in the installation space. Thus, if the installation space ventilation fails or is too weak, the air conditioning system must be switched off, since combustible vapours can form in the installation space.

As previously stated, in the prior art an air conditioning system switch-off device is required which monitors the air flow through the ram air channel. This air conditioning system switch-off device is not necessary in the present invention as soon as the cabin air conditioning system is switched on. If the air flow through the ram air channel fails, there is no air flow to cool the heat exchanger. Consequently, the engine bleed air to be cooled by the heat exchanger is not cooled. Thus, the engine bleed air retains its high temperature which is detected by a sensor of the cabin air conditioning system. As air may not flow into the cabin at too high a temperature, the cabin air conditioning system must be switched off. This is performed by the control unit of the cabin air conditioning system. Thus, as soon as the cabin air conditioning system is switched on, no additional air conditioning switch-off device is required which monitors the function of the ventilation device and the air flow in the ram air channel, respectively, and ensures that no combustible mixture forms in the installation space of the at least one heat-loaded component. Thus, the safety and the reliability of the aircraft are increased.

In flight this error case cannot occur, as the air inlet flap (not shown) comprises a passive means, for example a stop, which ensures that the air inlet flap cannot be closed completely. This ensures that the installation space of the at least one component of the cabin air conditioning system and/or the components of the cabin air conditioning system are supplied with sufficient cooling air through the distribution line 12.

With continued reference to FIG. 1, a cabin air conditioning system 30 which uses the teachings of the present invention comprises the cooling system according to the invention, a temperature detection device 32 which detects the temperature of the air flowing out of the heat exchanger 10 which is passed into the cabin 34 and is to be cooled by the ram air, and a control device 36 which controls the function of the cabin air conditioning system 30. The control device 36 is formed such that the cabin air conditioning system 30 is switched off, if the air emerging from the heat exchanger 10 which is passed into the cabin 34 and is to be cooled by the ram air exceeds a threshold value. The air to be cooled by the ram air in the heat exchanger 10 can be engine bleed air. In this cabin air conditioning system 30, as previously stated, no additional air conditioning system switch-off device is required to monitor the function of the ventilation device and/or the presence of an air flow in the ram air channel 2 as soon as the air conditioning system 30 is switched on. In this cabin air conditioning system 30, the presence of an air flow in the ram air channel 2, and hence the function of the ventilation device, is monitored indirectly, namely via the temperature of the air emerging from the heat exchanger 10 which is to be cooled by the ram air, as measured by the temperature detection device 32. It will be understood that the cooling systems shown in FIGS. 2 through 6 and described below may also be included as part of a cabin air conditioning system consistent with the description above.

The temperature of the air emerging from the heat exchanger 10 which is passed into the cabin and is to be cooled by the ram air can be detected by the temperature detection device at the outlet of the heat exchanger and/or at any arbitrary point in the air conditioning system. As previously stated, the air emerging from the heat exchanger which is passed into the cabin and is to be cooled by the ram air is mixed with another air flow and/or further treated before its temperature is detected. For example the temperature of the air can be detected at the mixer and/or at the inlet to the cabin.

As previously stated, before switching on the air conditioning system, the installation space must be ventilated. This ventilation is necessary, since also with the cabin air conditioning system switched off, fuel and/or fuel vapours can collect or form in the installation space of the at least one heat-loaded component. Here it can for example be monitored, whether the actual speed of the blower 8 before switching on the cabin air conditioning system is within a desired range for a sufficiently long period of time. This monitoring can be switched off as soon as the air conditioning system is switched on.

In the embodiment shown in FIG. 1, the bypass 16 has a smaller cross-section than the ram air channel 2, which, however, need not necessarily be the case.

Figure 2:
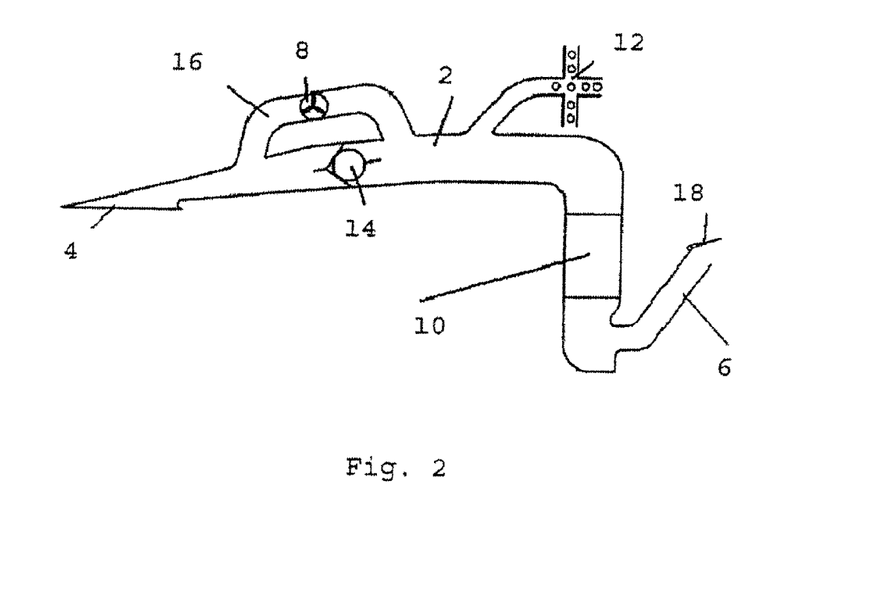
FIG. 2 an embodiment in which a one-way valve is arranged in the ram air channel, wherein the one-way valve is bridged by a bypass in which a ventilation device is arranged.

In the embodiment according to FIG. 2, the one-way valve 14 is arranged in the ram air channel 2 and the ventilation device 8 is arranged in the bypass 16. Otherwise the function of the embodiment in FIG. 2 corresponds to that of the embodiment in FIG. 1. The bypass 16 can have a smaller cross-section than the ram air channel 2. It is, however, also possible for the bypass 16 to have the same cross-section or a larger cross-section than the ram air channel 2. The bypass 16 and the area of the ram air channel it bridges can also be regarded as parallel branches of the ram air channel 2.

Figure 3:
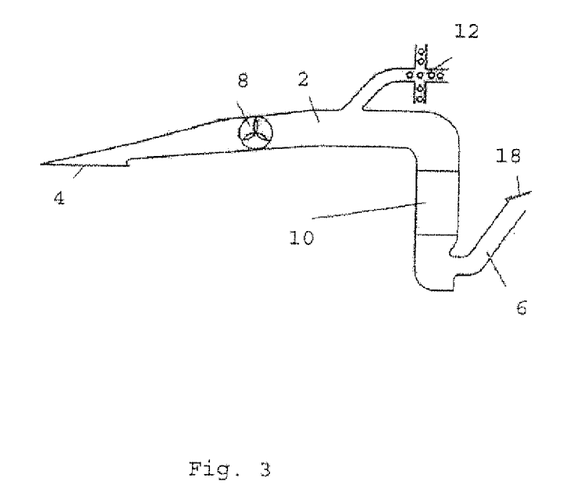
FIG. 3 an embodiment without bypass and one-way valve, in which the ventilation device is arranged upstream of the distribution line and the heat exchanger.

It is, however, not essential for the cooling system to have a bypass. FIG. 3 shows an embodiment of the invention in which there is no bypass and no one-way valve. Otherwise this embodiment corresponds to the embodiments according to FIGS. 1 and 2. In this embodiment it must be ensured that the air flowing through the ram air channel 2 in flight does not damage the ventilation device 8. Furthermore, the ventilation device must present no essential resistance to the air flowing through the ram air channel 2.

In the embodiment shown in FIG. 3, the ventilation device 8 is arranged upstream of the distribution line 12 and the heat exchanger 10. Consequently, the ventilation device 8 generates a positive pressure which ensures that the installation space of the component is ventilated and the components of the aircraft, in particular the cabin air conditioning system, are supplied with cooling air through the distribution line 12. Furthermore, the positive pressure causes cooling air to flow through the heat exchanger 10 and be drawn in by the ventilation device 8 exclusively from the air inlet 4. The control and the monitoring of the ventilation device 8 correspond substantially to those of the embodiment in FIG. 1.

Figure 4:
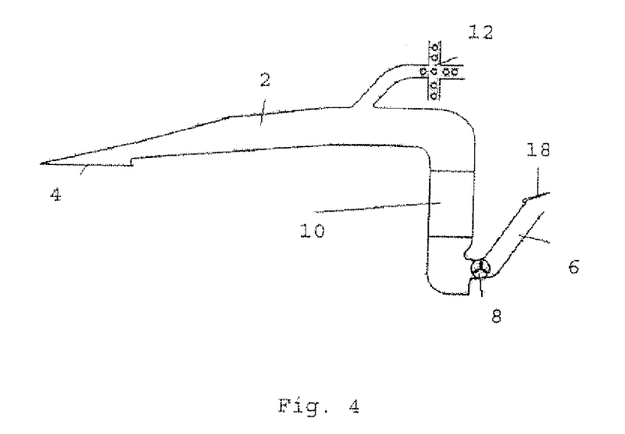
FIG. 4 an embodiment without bypass and one-way valve, in which the ventilation device is arranged downstream of the distribution line and the heat exchanger.

FIG. 4 shows a further embodiment of the invention in which the ventilation device 8 is arranged downstream of the distribution line 12 and the heat exchanger 10. The ventilation device 8 can be arranged in the vicinity of the air outlet 6. In this case the ventilation device 8 draws in a first part of the air from the distribution line 12 and a second part of the air via the air inlet 4. As the first part of the air is heated by the cooled components, the first part should be smaller than the second part so that the temperature of the air drawn in on entry into the heat exchanger 10 is not too high. In this embodiment too it must be ensured that the air flowing through the ram air channel 2 in flight does not damage the ventilation device 8. Clearly the ventilation device 8 must not constitute a substantial resistance to the air flowing through the ram air channel 2. The control and the monitoring of the ventilation device 8 substantially correspond to those of the embodiment in FIG. 1.

Figure 5:
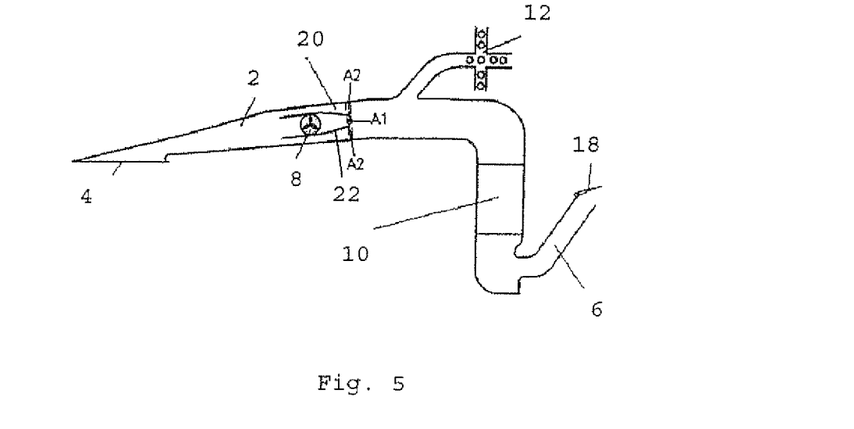
FIG. 5 an embodiment in which a blower is arranged in a blower channel, wherein the blower channel lies inside the ram air channel.

FIG. 5 shows an embodiment of the invention in which a blower 8 is arranged in a blower channel 22. The blower channel 22 has a smaller cross-section than the ram air channel 2 and is arranged in the ram air channel. The blower channel 22 has an outlet area A1. The remaining part of the ram air channel 2 at the outlet of the blower channel 22 has an area A2. During flight, the air flows through the ram air channel 2 through a bypass area 20 past the blower 8, the bypass area 20 being formed around the blower channel 22.

The blower 8 generates a positive pressure which supplies the heat exchanger 10 with cooling air and the distribution line 12 with air to ventilate the installation space and/or to cool the at least one component. Air transported by the blower 8 must be prevented from flowing through the bypass area 20 to the intake area of the blower 8. This is achieved in that the area A2 of the bypass area 20, in relation to the area A1 of the blower channel 22, is dimensioned such that, if the blower 8 transports air, the static pressure at the blower channel outlet is less than or equal to the static pressure at the end of the bypass area 20. In this case the entire flow energy generated by the blower is located in the dynamic part of the flow through the air outlet area A1 of the blower channel 22.

It is also possible to provide a one-way valve in the bypass area.

In FIG. 5, the blower 8, the blower channel 22 and the bypass area 20 are arranged upstream of the distribution line 12 and the heat exchanger 10. The blower 8, the blower channel 22 and the bypass area 20 can also be arranged downstream of the distribution line 12 or the heat exchanger 10. The control and the monitoring of the blower 8 correspond substantially to those of the embodiment in FIG. 1.

Figure 6:
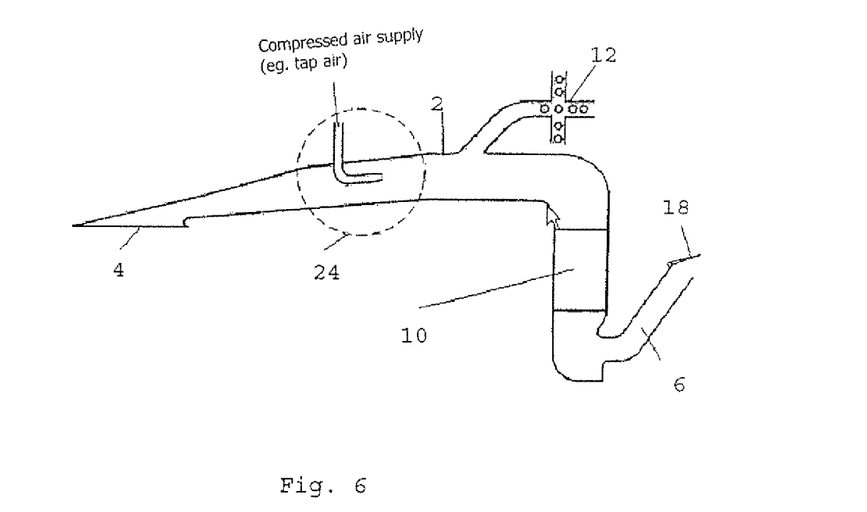
FIG. 6 an embodiment with an air injection device.

FIG. 6 shows a further embodiment of the invention in which the ventilation device is formed as an air injection device 24. The air injection device 24 injects compressed air, for example bleed air, into the ram air channel 2. As a result, in the ram air channel 2 an air flow can be generated which causes air to be drawn in from the air inlet 4, which enters the distribution line 12 and flows through the heat exchanger 10. In flight, the air flows past the air injection device 24. It is also possible that the air injection device 24 injects air into the ram air channel 2 during flight. The bleed air can be cooled before being injected into the ram air channel 2. Otherwise the function and the monitoring of this embodiment substantially correspond to those of the embodiment in FIG. 3.

In FIG. 6 the air injection device 24 is arranged upstream of the distribution line 12 and the heat exchanger 10. The air injection device 24 can also be arranged downstream of the distribution line 12 or the heat exchanger 10.

It is an advantage of the present invention that no additional ram air channel is required to cool a heat-loaded component of the aircraft, in particular of the cabin air conditioning system, and/or to ventilate its installation space. This saves space and mass. In addition, the installation of the cooling system is simplified. Furthermore on the ground no additional ventilation device is required to cool the previously mentioned heat-loaded component of the aircraft and the cabin air conditioning system, respectively, and/or to ventilate its installation space. This saves further space and mass and, furthermore, the availability is increased. In addition, the air resistance of the aircraft is reduced, as fewer ram air channels are required. Furthermore, as previously stated, monitoring of the air flow in the ram air channel is simplified.

The invention claimed is:

1. A cooling system for an aircraft, comprising:
a ram air channel for the aircraft;
an air inlet through which air from the environment of the aircraft enters the ram air channel;
an air outlet through which air emerges from the ram air channel;
a heat exchanger of a cabin air conditioning system, the heat exchanger being arranged in the ram air channel and connected to a cabin of the aircraft so as to supply air cooled by the ram air flowing through the ram air channel to the cabin;
a distribution line connected to the ram air channel upstream of the heat exchanger, and adapted to ventilate an installation space of at least one heat-loaded component of the cabin air conditioning system;
a ventilation device arranged upstream of the distribution line and in fluid communication with the rain air channel and the distribution line such that the ventilation device is adapted to induce an air flow through the heat exchanger and through the distribution line;
a temperature detection device which detects the temperature of air flowing out of the heat exchanger to the cabin; and
a control device configured to determine if the air flowing out of the heat exchanger to the cabin exceeds a temperature threshold, wherein a one-way valve is arranged in the ram air channel which causes flow of the air in the ram air channel only from the air inlet to the air outlet, and wherein the ram air channel is divided into first and second parallel flow branches, the one-way valve being arranged in the first branch and the ventilation device being arranged the second branch.

2. The cooling system according to claim 1, wherein the ventilation device is a blower.

3. The cooling system according to claim 1, wherein the one-way valve is arranged upstream of the distribution line.

4. The cooling system according to claim 2, wherein the blower is arranged in the ram air channel so that air can flow around the blower.

5. The cooling system according to claim 1, wherein an actuatable flap is located at least at one of the air inlet of the ram air channel and the air outlet of the ram air channel.

6. A cabin air conditioning system for an aircraft, comprising:
  a cooling system including:
    a ram air channel for the aircraft;
    an air inlet through which air from the environment or the aircraft enters the ram air channel;
    an air outlet through which air emerges from the rain air channel;
    a heat exchanger of a cabin air conditioning system, the heat exchanger being arranged in the ram air channel and connected to a cabin of the aircraft so as to supply air cooled by the ram air flowing through the ram air channel to the cabin;
    a distribution line connected to the ram air channel upstream of the heat exchanger, and adapted to ventilate an installation space of at least one heat-loaded component of the cabin air conditioning system; and
    a ventilation device arranged upstream of the distribution line and in fluid communication with the rain air channel and the distribution line such that the ventilation device is adapted to induce an air flow through the heat exchanger and through the distribution line;
  a temperature detection device which detects the temperature of the air flowing out of the heat exchanger which is cooled by the ram air, and
  a control device which controls the fun ion of the cabin air conditioning system, wherein the control device is formed such that the cabin air conditioning system is switched off if the temperature of the air flowing out of the heat exchanger which is passed to the cabin and is cooled by the ram air exceeds a threshold value.

7. The cabin air conditioning system according to claim 6, wherein the air to be cooled in the heat exchanger by the ram air is engine bleed air.

8. The cabin air conditioning system according to claim 6, wherein the ventilation device is a blower.

9. The cabin air conditioning system according to claim 6, wherein a one-way valve is arranged in the ram air channel which causes flow of the air in the ram air channel only from the air inlet to the air outlet.

10. The cabin air conditioning system according to claim 9, wherein the ram air channel is divided into first and second parallel flow branches, the one-way valve being arranged in the first branch and the ventilation device being arranged in the second branch.

11. The cabin air conditioning system according to claim 9, wherein the one-way valve is arranged upstream of the distribution line.

12. The cabin air conditioning system according to claim 8, wherein the blower is arranged in the ram air channel so that air can flow around the blower.

13. The cabin air conditioning system according to claim 6, wherein an actuatable flap is located at least at one of the air inlet of the ram air channel and the air outlet of the ram air channel.

* * * * *